United States Patent [19]

Rix et al.

[11] Patent Number: 4,577,200

[45] Date of Patent: Mar. 18, 1986

[54] CASSETTE FOR THE INK JET PRINTER OF AN OFFICE MACHINE

[75] Inventors: Albert Rix, Wilhelmshaven; Horst Martens, Varel; Dieter Drogi, Wilhelmshaven; Klaus-Dieter Frerichs; Wolfgang Leschik, both of Schortens, all of Fed. Rep. of Germany

[73] Assignee: Olympia Werke AG, Wilhelmshaven, Fed. Rep. of Germany

[21] Appl. No.: 672,178

[22] Filed: Nov. 15, 1984

[30] Foreign Application Priority Data

Nov. 26, 1983 [DE] Fed. Rep. of Germany ....... 3342894

[51] Int. Cl.⁴ ............................................. G01D 15/16

[52] U.S. Cl. ........................... 346/140 R; 346/139 R; 400/126; 400/175

[58] Field of Search ...................... 346/140, 75, 139 R; 400/126, 171, 175

[56] References Cited

U.S. PATENT DOCUMENTS

| | | | |
|---|---|---|---|
| 3,787,880 | 1/1974 | Kattner et al. | 346/75 |
| 4,074,284 | 2/1978 | Dexter | 346/140 |
| 4,496,959 | 1/1985 | Frerichs | 346/140 |

*Primary Examiner*—Joseph W. Hartary
*Attorney, Agent, or Firm*—Spencer & Frank

[57] ABSTRACT

A cassette containing a printing head removably installed in an ink jet printing machine. The cassette includes a housing which encloses the printing head in a protective manner when the cassette is removed from the machine and when the cassette is installed in the machine and the printing head is in an inoperative position. The head and housing are provided with locking elememts for securing the head in the housing when the cassette is to be removed.

The machine includes a carriage for moving the printing head past a record carrier during printing operations, locking elements for locking the printing head onto the carriage when the cassette is installed in the machine, a receptacle for holding the housing in the machine, and a mechanism for releasing the locking elements when the printing head is in the inoperative position to permit removal of the cassette from the machine.

21 Claims, 6 Drawing Figures

CASSETTE FOR THE INK JET PRINTER OF AN OFFICE MACHINE

BACKGROUND OF THE INVENTION

The present invention relates to a cassette for the printing head of an ink jet printer for a typewriter.

Demands, on the one hand, for high script quality close to typewritten script, i.e. letter quality, and also for high print quality are increasing steadily for printing mechanisms employing dot matrix printing heads. For this purpose, a printing head may be provided with two rows of ink jet openings which are arranged parallel to one another in the direction of the matrix columns, with these ink jet openings being arranged in such a manner that one row is offset with respect to the other. For the production of draft quality print, ink droplets are discharged selectively from the ink jet openings of one row, while for the production of letter quality print, ink droplets are ejected from the ink jet openings of both rows. Since this requires different, printer controls, it is advisable to use different printing heads which are equipped with corresponding code markers. These code markers cooperate automatically with a decoding circuit in the machine when the printing mechanism is changed. In this way, errors on the part of the operator are excluded.

DE-AS [Federal Republic of Germany Published Application ] No. 2,142,409 discloses exchanging printing heads in ink jet printers if the interior of the printing head is soiled or one of the discharge openings is clogged. The printing head is here coupled, by means of plug-in connections which establish the electrical and mechanical connections, with a carriage which moves along the record carrier. Since exchange of the printing head is possible in any desired position of the carriage and the discharge nozzles are not protected against soiling, it can easily happen that they clog and thus that individual jet discharge openings no longer participate in the printing process.

SUMMARY OF THE INVENTION

It is an object of the present invention to provide a cassette for the printing head of an ink jet printer in a typewriter which allows easy exchange of the printing head without subsequent malfunction in the printing operation and which prevents errors on the part of the person operating the machine. The above and other objects are achieved, according to the invention, by the provision of an ink jet printing head cassette assembly comprising an ink jet printing head for use in an office machine equipped with a carriage for moving the printing head past a record carrier during a printing operation, the carriage being provided with holding elements for holding the printing head and the carriage being arranged for moving the printing head into a rest position at the conclusion of a printing operation, the machine further being equipped with a receptable having holding members and with means for establishing electrical, mechanical and ink supply plug-in connections with the printing head when the printing head is mounted on the carriage, the assembly further comprising: a housing arranged to be inserted, together with the printing head, into the receptable when the assembly is installed in the office machine so that the housing is held by the holding members of the receptable and the printing head is held by the holding elements of the carriage, the housing being disposed for receiving and protecting the printing head when the printing head is in the rest position and when the housing is removed from the receptable; and holding means associated with the housing and the printing head, for securely holding the printing head in the housing when the housing is removed from the receptable.

The cassette according to the present invention permits simple and safe manipulation in the exchange of printing heads, with the printing head being exchangeable only while the carriage is in the rest position and the printing head is always being protected, particularly against soiling, when it is removed from the carriage.

According to an advantageous embodiment of the invention, operator errors are made impossible since the respective electronic control system is exchanged together with the printing head. According to a further feature of the invention, when the printing head is exchanged, the covering device is also exchanged so that clogging and soiling of the discharge nozzles is substantially avoided. Moreover, the cassette including the printing head and the electronic control system can be manufactured and mounted in a separate sterile environment so that the usual manufacturing influences are kept away from these sensitive parts.

The present invention will now be described in greater detail with the reference to an embodiment.

DESCRIPTION OF THE PREFERRED EMBODIMENTS

Figure 1:
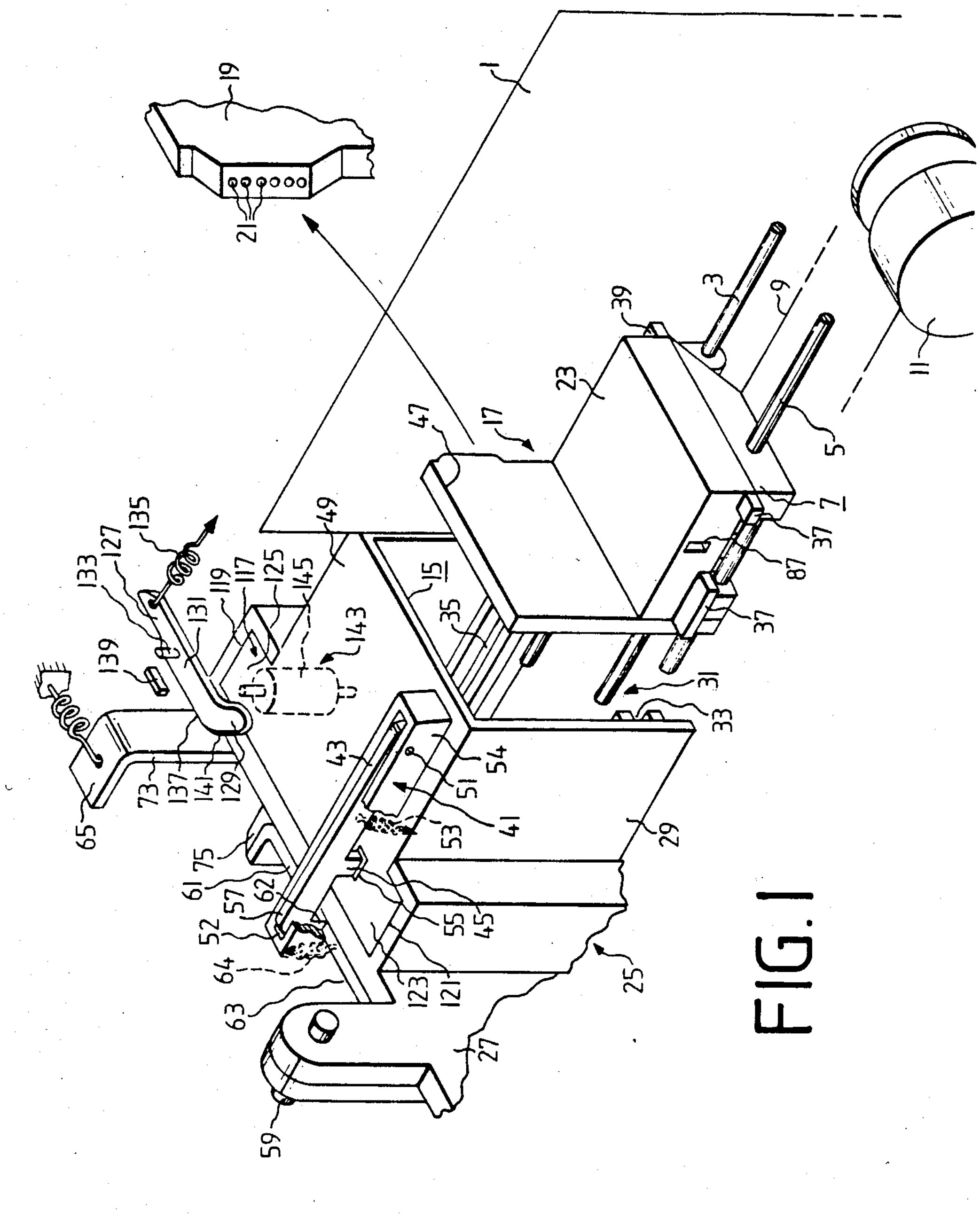
FIG. 1 is a perspective view of an ink jet printer incorporating the present invention.

FIG. 1 shows a carriage 7 which moves on guide rails 3 and 5 adjacent to record carrier 1 and is driven by a motor, e.g. a stepping motor 11, in a known manner via a cable 9. Record carrier 1 passes around a platen 13 (shown in FIG. 2) which is driven by a conventional stepping motor (not shown). FIG. 1 shows a cassette 15 for the printing head 17 of an ink jet printer in a typewriter, with the printing head 17 being composed of a dot matrix printing head component 19 with discharge nozzles 21 and an intermediate ink container 23 permanently connected to component 19. Printing head 17 can be coupled with movable carriage 7 by means of a plug-in connection which establishes both the electrical and mechanical connections. Moreover, printing head 17 includes means for the additional, immediate and automatic establishment of a plug-in connection with an ink supply line.

Cassette 15 is composed of a housing 29 which is seated in a receptacle 25 disposed in a side wall 27 of the machine and can be held there, with printing head 17 in its inoperative position being protected whether it is disposed within or outside of receptacle 25. Holding means are provided at printing head 17 and at housing 29 with which printing head 17, when it is dismounted from carriage 7, is secured in housing 29 and, if housing 29 is mounted in the machine, printing head 17 is secured by holding members in receptacle 25 and by holding members in carriage 7.

Housing 29 of cassette 15 has an opening 31 for moving carriage 7 and printing head 17 in and out of cassette 15. For this purpose, guide grooves 33 and 35 are provided in housing 29 to both sides of opening 31 and these guide grooves can be brought into interlocking engagement with guide bars 37 and 39 which are provided as an integral part of printing head 17. After moving printing head 17 into housing 29, head 17 is arrested by means of a locking member 41. This locking member 41 is a blocking lever 43 equipped with a blocking tongue 45 which, when housing 29 is being removed from receptacle 25, latches behind a detent edge 47 of printing head 17. Blocking lever 43 is mounted on the upper surface 49 of housing 29 in a recess 52 of a bearing block 54 so as to be pivotable about an axis 51 and can be loaded by a spring 53 in such a manner that blocking tongue 45 can be brought through an opening 55 in housing 29 to a position in front of detent edge 47 of printing head 17. This causes printing head 17 to be positively arrested, i.e. locked, in housing 29 so that printing head 17 and housing 29 form an independent transporting unit.

The free end 57 of blocking lever 43 projects over side wall 27 in such a manner that an intermediate lever 61 which is mounted at receptable 25 so as to be pvioted about fulcrum 59 between two end positions causes blocking lever 43 to be moved, by way of an abutment tongue 62 of lever 43, between its blocking position and an unblocking position. Recess 52 in bearing block 54 and blocking lever 43 are designed in such a way that blocking lever 43, when cassette 15 is removed from receptable 25, can be moved out of its blocking position only by means of a special tool to release printing head 17. In this way, the machine operator is prevented from arbitrarily removing head 17 from housing 29. Such a separation should be made only by a customer service representative.

Intermediate lever 61 is pivotal about an axis 59 and, with cassette 15 inserted, rests against an abutment 63 provided at the machine frame. In this position, as shown in FIG. 1, blocking tongue 45 is out of engagement with detent edge 47 of printing head 17 so that carriage 7 can be moved out of its rest position in the housing at any time and returned into the housing after each printing process.

If printing head 17 is to be exchanged, i.e. if cassette 15 and printing head 17 are to be removed from the machine, intermediate lever 61 must be pivoted away downwardly against the force of a spring 64 until blocking lever 43 is released so that blocking tongue 45 can drop in through opening 55.

Figure 2:
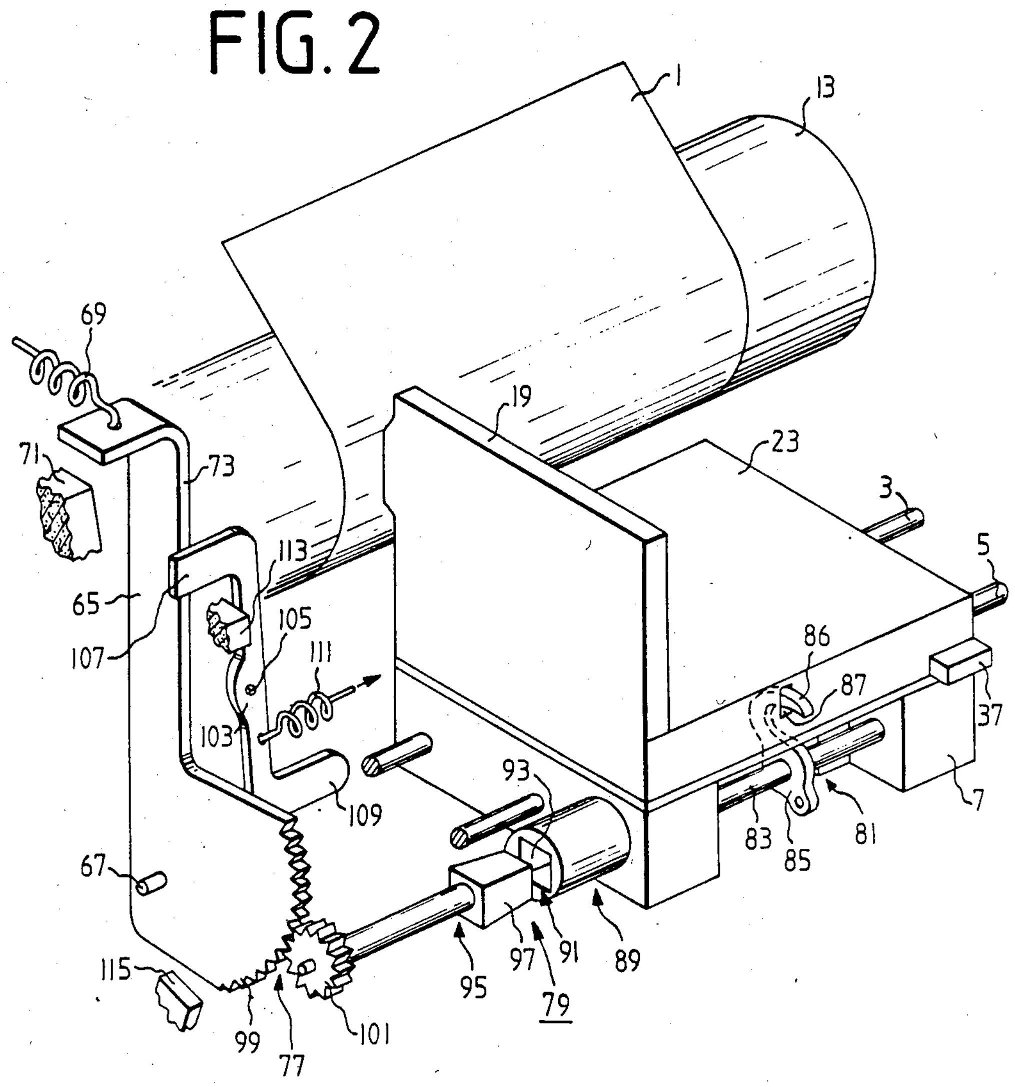
FIG. 2 is a perspective detail view of a portion of the structure of FIG. 1, looking toward the back of FIG. 1.

Such pivoting of intermediate lever 61 is effected by way of a manually operated control lever 65, shown in detail in FIG. 2, which is mounted in side wall 27 so as to be pivotal about axis 67 between two end positions. To exchange cassette 15, control lever 65 is pivoted clockwise as seen in FIG. 2, against the force of a spring 69, to thus be displaced from its fixed rest abutment 71 in the machine frame. This causes an abutment edge 73 of control lever 65 to press down on an inclined surface 75 of intermediate lever 61 in such a manner that blocking lever 61 is pivoted downwardly and lever 43 is released and enabled to drop into its blocking position.

Manually actuatable control lever 65 is coupled, via intermediate members 77 and a coupling 89, 95 with a locking device 81 for printing head 17 at movable carriage 7, when the latter is in its inoperative position. This locking device 81 is provided with a locking shaft 83 which is rotatably mounted in carriage 7 and is equipped with a latch hook 85 with which printing head 17, composed of dot matrix printing head component 19 intermediate ink container 23, can be firmly arrested on carriage 7 via an abutment 87 carried by container 23.

Locking shaft 83 is provided with a coupling half 89 which has a prismatic recess 91 whose side faces 93 are conically tapered toward its outer end. The other coupling half 95 is mounted so as to be rotatable in the machine frame and is provided with a gripper pin 97 which has a shape corresponding to the prismatic recess 91. Coupling half 95 is connected with control lever 65 by way of a step-up gear constituted by intermediate members 77. For this purpose, intermediate members 77 include a toothed wheel 101 fixed to gripper pin 97 and gear teeth 99 formed on control lever 65 and arranged to mesh with the teeth of wheel 101.

Depending on the pivoting direction of control lever 65, the two coupling halves 89 and 95, and thus locking shaft 83, can be pivoted in such a manner that latch hook 85 is brought into or out of engagement with abutment 87 at intermediate ink container 23. Within the scope of the present invention, latch hook 85 can be replaced by a modified hook which presses printing head 17 firmly against carriage 7. One embodiment of such a modified hook will be described below with reference to FIGS. 4, 5A and 5B. It must then be assured that the electrical and ink-supplying plug-in connections are coupled together accurately.

Control lever 65 can be blocked in its starting, or rest, position shown in FIG. 2 by a blocking lever 103. This blocking lever 103 is mounted so as to be pivotal about an axis 105 in the machine frame and is provided with an abutment arm 109 which, when carriage 7 is moved into the inoperative position in housing 15, can be pressed by carriage 7, against the force of a return spring 111, to release control lever 65. At the same time, lever 103 is moved away from an abutment 113 which is part of the machine frame. Whenever carriage 7 is in its inoperative position, blocking lever 103 is pivoted by carriage 7 to release control lever 65, with the two coupling halves 89, 97 always being coupled together. If printing head 17 is to be removed, it is only necessary to rotate control lever 65 clockwise until it abuts at abutment 115. This causes latch hook 85 and its latch tongue 86 to be rotated away from abutment 87. According to FIG. 2, printing head 17 can then be extracted toward the top. This removal is effected, as shown in FIG. 1, by removing cassette 15 and printing head 17 as a unit.

Referring to FIG. 1, cassette 15 can be inserted by being pushed into receptacle 25 which is provided with an insertion opening 117 equipped with guides 119, 121 for guide elements 123, 125 which form part of housing 29. Cassette 15 can be arrested in its inserted position in receptacle 25 by means of a blocking lever 127 which is mounted so as to be pivotal about an axis 133 at the machine housing and has a blocking tongue 129 which can be pivoted into position above insertion opening 117. Blocking tongue 129 is disposed at an arm 131 of blocking lever 127. Arm 131 is held in the position in which blocking tongue is above opening 117 by lever 65 when lever 65 is in its rest position. A spring 135 is connected between blocking lever 127 and the machine housing to bring blocking lever 127 out of the range of insertion opening 117 as soon as manually actuated control lever 65 is pivoted from its rest position into its release position. An abutment edge 137 of arm 131, which rests against control lever 65 when lever 65 is in its rest position, then comes to rest against an abutment 139 which is part of the machine housing. When control lever 65 is pivoted back into its rest position, control lever 65 engages a camming surface 141 at blocking tongue 129 of blocking lever 127 in such a manner that lever 127 is pivoted into the region of insertion opening 117. This again accurately secures cassette 15 which is disposed in receptacle 25.

A covering device 143 is also disposed in housing 29 of cassette 15 for covering discharge nozzles 21 of dot matrix printing head 19. This reliably prevents soiling of discharge nozzles 21 and clogging of the nozzles during intervals between printing operations and also during exchange of printing heads. Covering device 143 may be of any desired configuration and may be comprised, for example, of a rotatably mounted covering roller 145 which is saturated with a cleaning fluid.

Figure 3:
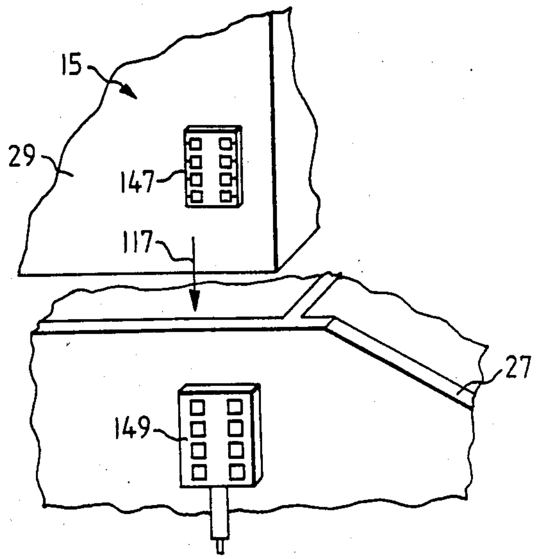
FIG. 3 is a perspective detail view illustrating an advantageous feature of the present invention.

Additionally, as shown in FIG. 3, codable control means 147 may be provided on housing 29. These control means can be brought into operative engagement with a detection device 149 mounted in wall 27 so as to extend into the receptacle 25 of the machine. This detection device 149 furnishes control signals via a decoding circuit to the printer control so as to generate the desired type of script. This completely eliminates the chance of operator errors.

Figure 4:
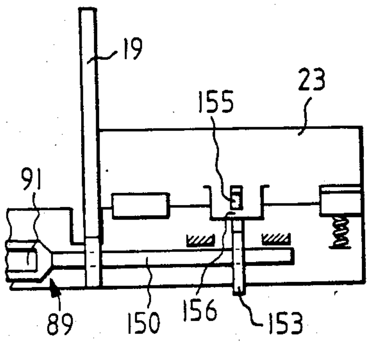
FIG. 4 is a detail elevational view of a second embodiment of the locking device of an arrangement according to the invention.
Figure 5A:
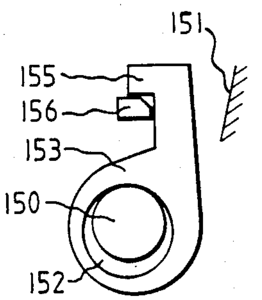
FIGS. 5A and 5B are detail views of an element of the structure of FIG. 4.
Figure 5B:
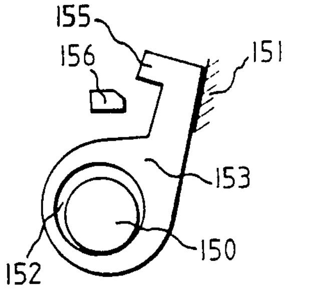

FIGS. 4, 5A and 5B show a locking device between carriage 7 and intermediate ink container 23, provided with one embodiment of the modified hook mentioned earlier herein. Locking shaft 150 carries an eccentric circular cam 152 which is fast to shaft 150 and which frictionally engages in a bore provided in locking hook 153. Hook 153 carries an abutment tongue 155 arranged to engage an abutment 156 carried by ink container 23.

FIG. 5A shows the locking device in its locked position, with tongue 155 pressing down on abutment 186 in order to press ink container 23 against carriage 7 and thus to assure secure coupling of associated electrical, mechanical and ink-conducting connecting means.

FIG. 5B shows the locking device in its unlocked position, permitting removal of printing head 17, together with cassette 15, from the machine. This position of hook 153 is defined by an abutment 151 carried by carriage 7.

For locking and unlocking, shaft 150 executes a rotation of the order of 180° while hook 153 is confined to a rotation of the order of 30° by abutments 151 and 156.

For movement from the unlocked position of FIG. 5B to the locked position of FIG. 5A, hook 153 rotates with shaft 150 during the first 30° of shaft rotation until the vertical arm of hook 153 reaches abutment 156. Then, during the remaining 150° of shaft rotation, cam 152 slides in the bore in hook 153 and pulls the hook down to cause it to press downwardly on abutment 156.

For unlocking, shaft 150 is rotated in the opposite direction. If there is a sufficient locking force between hook 153 and abutment 156, the first part of this rotation will be associated with a sliding movement between cam 152 and the bore in hook 153 until hook 153 has been raised sufficiently to reduce this force. Then hook 153 rotates with shaft 150 until reaching abutment 151. Thereafter, shaft 150 completes its rotational movement, accompanied by a sliding movement between cam 152 and the bore in hook 153.

One suitable example of the electrical, mechanical and ink supply plug-in connections between printing head 17 and carriage 7 are disclosed in the U.S. patent application, Ser. No. 417,897 filed Sept. 14, 1982 now Pat. No. 4,496,959.

Electronically controlled printers and typing systems of a large variety of capabilities and types are well known, a typical example being a system such as disclosed in the U.S. patent application Ser. No. 144 716, filed Apr. 28, 1980 now abandoned.

It will be understood that the above description of the present invention is susceptible to various modifications, changes and adaptations, and the same are intended to be comprehended within the meaning and range of equivalents of the appended claims.

What is claimed is:

1. An ink jet printing head cassette assembly comprising an ink jet printing head for use in an office machine equipped with a carriage for moving said printing head past a record carrier during a printing operation, the carriage being provided with holding elements for holding said printing head and the carriage being arranged for moving said printing head into a rest position at the conclusion of a printing operation, the machine further being equipped with a receptacle having holding members and with means for establishing electrical, mechanical and ink supply plug-in connections with said printing head when said printing head is mounted on the carriage, said assembly further comprising: a housing arranged to be inserted, together with said printing head, into the receptacle when said assembly is installed in the office machine so that said housing is held by the holding members of the receptacle and said printing head is held by the holding elements of the carriage, said housing being disposed for receiving and protecting said printing head when said printing head is in said rest position and when said housing is removed from the receptacle; and holding means associated with said housing and said printing head for securely holding said printing head in said housing when said housing is removed from the receptacle.

2. Assembly as defined in claim 1 in which the office machine includes a side wall outside of the region in which the printing operation is performed and the receptacle is disposed at the side wall, and wherein said printing head comprises a printing head component and means providing an intermediate ink supply permanently connected to said printing head component, and said housing is provided with an opening for passage of the carriage with said printing head mounted thereon into and out of said housing.

3. Assembly as defined in claim 2 wherein said holding means comprise guide grooves mounted inside said housing to each side of said opening, and guide bars carried by said printing head for engaging said guide grooves as said printing head is moved into said housing.

4. Assembly as defined in claim 3 wherein said holding means further comprise a locking member mounted on said housing and movable into a locking position for securing said printing head in said housing.

5. Assembly as defined in claim 4 wherein said holding means further comprise a detent element carried by said printing head and said locking member comprises a locking lever having a blocking tongue arranged to engage said detent element when said locking member is in said locking position and said housing is being removed from the receptacle.

6. Assembly as defined in claim 5 wherein said housing has a top wall provided with an opening and said locking lever is mounted at said top wall to be pivotal about an axis which is stationary relative to said top wall, and said locking member further comprises spring means connected to said locking lever for urging said locking lever in a direction to cause said blocking tongue to pass through said opening in said top wall when said locking member is in said locking position.

7. Assembly as defined in claim 6 wherein the machine is provided with an intermediate lever pivotally mounted on the receptacle for movement between two end positions, and said locking lever has a free end disposed to cooperate with the intermediate lever when said housing is disposed in the receptacle for causing said locking member to be moved into and out of its locking position in response to movement of the intermediate lever to respective ones of its end positions.

8. An assembly as defined in claim 1 wherein said printing head has at least one ink discharge nozzle, and further comprising a covering device disposed in said housing for covering said discharge nozzle when said printing head is in said rest position.

9. An office writing machine equipped to be provided with a removable ink jet printing head assembly having a printing head and a housing for containing the printing head when a printing operation is not being performed or when the printing assembly is removed from said machine, the housing having guide elements, said machine comprising: a receptacle having an insertion opening via which the assembly is inserted in and removed from said machine, said receptacle being provided with guides arranged to cooperate with the housing guide elements for positioning the assembly in said machine; and a blocking lever pivotably mounted in said machine and pivotable into a blocking position for locking an assembly in place in said receptacle.

10. A machine as defined in claim 9 wherein said blocking lever is provided with a blocking tongue via which the assembly is locked in place when said blocking lever is in its blocking position, and said machine further comprises: a manually operable control lever pivotably mounted on said machine for movement between a first position for maintaining said blocking lever in its said blocking position and a second position for permitting said blocking lever to pivot out of said blocking position so that said blocking tongue displaced from the insertion opening and the assembly can be removed from said receptacle; and resetting spring means operatively associated with said blocking lever for urging said blocking lever out of its blocking position.

11. A machine as defined in claim 10 further comprising: a carriage for supporting the printing head when the assembly is inserted in said machine and for moving the printing head past a record carrier during a printing operation, said carriage being movable into a rest position in which the printing head is within the housing; a movable locking device mounted on said carriage and movable into a locking position for locking the printing head to said carriage; and coupling means for coupling said locking device to said control lever when said carriage is in said rest position for effecting movement of said locking device in response to movement of said control lever, and wherein said receptacle includes a side wall on which said control lever is pivotably mounted.

12. A machine as defined in claim 10 further comprising a fixed abutment positioned to be contacted by said blocking lever when said blocking lever is pivoted out of said blocking position, and wherein said blocking lever is provided with a camming surface disposed to be acted upon by said control lever for causing said blocking lever to be moved into its blocking position in response to movement of said control lever from its second position to its first position.

13. A machine as defined in claim 12 further comprising: a carriage for supporting the printing head when the assembly is inserted in said machine and for moving the printing head past a record carrier during a printing operation, said carriage being movable into a rest position in which the printing head is within the housing; a movable locking device mounted on said carraige and movable into a locking position for locking the printing head to said carriage; and coupling means for coupling said locking device to said control lever when said carriage is in said rest position for effecting movement of said locking device in response to movement of said control lever, and wherein said receptacle includes a side wall on which said control lever is pivotably mounted.

14. A machine as defined in claim 13 wherein the printing head is provided with an abutment element, and said movable locking device comprises a shaft pivotably mounted in said carriage and a latch hook carried by said shaft and pivotable with said shaft into a position for engaging the abutment element to secure the printing head to said carriage.

15. A machine as defined in claim 14 wherein said coupling means comprise a first coupling half carried by said shaft and a second coupling half rotatably mounted in said machine, said first coupling half comprising means defining a prismatic recess opening toward said second coupling half and having recess walls which diverge toward said second coupling half, and said second coupling half comprising a prismatic plug member directed toward said first coupling half and corresponding in shape to said recess.

16. A machine as defined in claim 15 wherein said coupling means further comprise gear means connecting said control lever to said second coupling half and having a step-up gear ratio in the direction from said control lever to said second coupling half.

17. A machine as defined in claim 16 wherein said gear means comprise a plurality of teeth carried by said control lever and extending over a circular arc concentric with the pivot axis of said control lever, and a toothed wheel fixed to said second coupling half and constructed to mesh with said teeth carried by said control lever.

18. A machine as defined in claim 17 further comprising a second blocking lever pivotably mounted in said machine and movable into a blocking position for blocking said control lever in its said first position.

19. A machine as defined in claim 18 further comprising biassing spring means operatively associated with said second blocking lever for biassing said second blocking lever to its blocking position, and a second fixed abutment against which said second blocking lever bears when in its blocking position, and wherein said second blocking lever comprises a blocking arm via which said control lever is blocked in its said first position when said second blocking lever is in its said blocking position, and an actuating arm located to respond to movement of said carriage to its rest position for moving said second blocking lever away from its said blocking position in order to unblock said control lever.

20. A machine as defined in claim 9 wherein the housing is provided with codable electrical control means providing representations of information specific to the printing head, and said machine further comprises: control signal detecting means mounted in said receptacle for operative connection with the control means when the housing is inserted in said receptacle for detecting the representations provided by the control means; decoding means connected to said detecting means for providing control signals corresponding to such representations; and printer control means connected to said decoding means for causing a selected type of script to be produced during a printing operation.

21. An ink jet printing head cassette assembly in combination with an office machine in which the assembly is removably installed, said machine comprising: a receptacle having an insertion opening and guides; a blocking lever pivotably mounted for movement into a blocking position above said insertion opening; and a carriage movable from a rest position past a record carrier to effect a printing operation and equipped with holding elements and with means for establishing electrical, mechanical and ink supply plug-in connections, and said assembly comprising: an ink jet printing head mounted on said carriage for movement therewith and detachably secured to said carriage by said holding elements for movement with said carriage, said head having connection elements detachably connected to said plug-in connections; a housing having guide elements and inserted, together with said printing head, into said receptacle when said assembly is installed in the office machine so that said guide elements cooperate with said guides to position said housing and said housing is held in place by said blocking lever, said housing being disposed for receiving and protecting said printing head when said carriage is in said rest position and when said housing is removed from said receptacle; and holding means associated with said housing and said printing head for securely holding said printing head in said housing when said housing is removed from said receptacle.

* * * * *